United States Patent
Salvador Marcos et al.

(10) Patent No.: US 9,781,357 B2
(45) Date of Patent: Oct. 3, 2017

(54) METHOD AND AN APPARATUS FOR GENERATING AN APPROXIMATE NEAREST NEIGHBOR FIELD (ANNF) FOR IMAGES AND VIDEO SEQUENCES

(71) Applicant: THOMSON LICENSING, Issy de Moulineaux (FR)

(72) Inventors: Jordi Salvador Marcos, Hamburg (DE); Melike Bagcilar, Ankara (TR); Axel Kochale, Springe (DE)

(73) Assignee: THOMSON LICENSING, Issy-les Moulineaux (FR)

(*) Notice: Subject to any disclaimer, the term of this patent is extended or adjusted under 35 U.S.C. 154(b) by 120 days.

(21) Appl. No.: 14/668,059

(22) Filed: Mar. 25, 2015

(65) Prior Publication Data

US 2015/0281597 A1 Oct. 1, 2015

(30) Foreign Application Priority Data

Mar. 26, 2014 (EP) .................................... 14305439

(51) Int. Cl.
*G06K 9/40* (2006.01)
*H04N 5/262* (2006.01)
(Continued)

(52) U.S. Cl.
CPC ......... *H04N 5/2628* (2013.01); *G06T 3/4053* (2013.01); *G06T 5/001* (2013.01); *H04N 5/265* (2013.01); *G06T 2207/20016* (2013.01)

(58) Field of Classification Search
USPC ........ 382/254, 298, 276, 293, 107; 345/419, 345/426; 386/278; 438/106, 659
See application file for complete search history.

(56) References Cited

U.S. PATENT DOCUMENTS 8,355,592 B1* 1/2013 Shechtman ........... G06T 3/0093
 345/419
8,929,683 B2* 1/2015 Gallo ...................... G06T 5/50
 382/276

(Continued)

OTHER PUBLICATIONS

Shahar et al., "Space-time super-resolution from a single video", IEEE conference Computer Vision and Pattern Recognition, Jun. 20, 2011, pp. 3353-3360.

(Continued)

*Primary Examiner* — Anh H Do
(74) *Attorney, Agent, or Firm* — Volpe and Koenig, P.C.

(57) ABSTRACT

An algorithm for performing super-resolution splits an input image or video into patches and relies on image self-similarity, wherein similar patches are searched in different downscaled versions of an image, using Approximate Nearest-Neighbor Fields (ANNF). The goal of ANNF is to locate with a minimal number of search iterations for each patch of a source image the k most similar patches in a downscaled version of the source image or video. A method for generating an ANNF for images of an input video comprises generating a plurality of downscaled versions of the images of the input video at different scales, generating an Inverse ANNF (IANNF) for the input video by finding for each patch of the downscaled images similar patches in the input video, generating an ANNF for the input video by reversing the IANNF, and filling gaps in the ANNF by random search.

17 Claims, 5 Drawing Sheets

(51) Int. Cl.
  *G06T 3/40* (2006.01)
  *G06T 5/00* (2006.01)
  *H04N 5/265* (2006.01)

(56) References Cited

U.S. PATENT DOCUMENTS

| | | |
|---|---|---|
| 9,129,399 B2 * | 9/2015 | Jin .......................... G06T 7/204 |
| 9,196,021 B2 * | 11/2015 | Jin .......................... G06T 5/002 |
| 2012/0086850 A1 | 4/2012 | Irani et al. |
| 2013/0163874 A1 | 6/2013 | Shechtman et al. |
| 2013/0163884 A1 | 6/2013 | Shechtman et al. |

OTHER PUBLICATIONS

Barnes et al., "PatchMatch—A Rondomized Correspondence Algorithm for Structural Image Editing", ACM Trans. on Graphics, vol. 28(3), 2009; pp. 1-10.
Barnes et al., "The Generalized PatchMatch Correspondence Algorithm", Computer Vision ECCV, Sep. 5, 2010, Springer, pp. 29-43.
Gould et al., "PatchMatchGraph—Building a Graph of Dense patcg Correspondences for Label Transfer", http://users.cecs.anu.edu.au/~sgould/papers/eccv12-patchGraph.pdf; Oct. 14, 2012; pp. 1-14.
Lu et al., "PatchMatch Filter Efficient Edge-Aware Filtering Meets Randomized Search for Fast Correspondence Field Estimation", CVPR2013, pp. 1854-1861.
Search Report Dated Sep. 25, 2014.

* cited by examiner

METHOD AND AN APPARATUS FOR GENERATING AN APPROXIMATE NEAREST NEIGHBOR FIELD (ANNF) FOR IMAGES AND VIDEO SEQUENCES

This application claims the benefit, under 35 U.S.C. §119 of European Patent Application No. 14305439.3, filed Mar. 26, 2014.

FIELD OF THE INVENTION

The invention relates a method and an apparatus for generating an Approximate Nearest2 Neighbor Field (ANNF) for images and video sequences. Further, the invention relates to a method and an apparatus for upscaling an input video, using an ANNF.

BACKGROUND

In a typical super-resolution application case, an input video sequence is given, from which several downscaled versions of the same video sequence can be computed. Alternatively, other images or video sequences may be used. Some known algorithms for performing super-resolution split the input image or video into patches and operate patch by patch. One known technique is based on image self-similarity, i.e. similar patches are searched in different downscaled versions of an image. It can be based on Approximate Nearest-Neighbor Fields (ANNF). The purpose of an ANNF is to locate for each patch of a source image or video, e.g. an input video, the k most similar patches out of all the available patches in a target image or video, e.g. spatio-temporally downscaled versions of the source image or video. All these patches have same size. Thus, an ANNF defines for each source patch one or more target patches.

"PatchMatch: A Randomized Correspondence Algorithm for Structural Image Editing", Barnes, C. et al., ACM Trans. on Graphics, vol. 28(3), 2009 [1] describes an iterative image editing approach for quickly finding Approximate Nearest Neighbor (ANN) matches between image patches. It is a fast algorithm for ANNF computation called Patch-Match, which relies on the iterative application of two stages: first, a random search is made with exponentially shrinking search windows, assuming an exponential distribution for the distance to the nearest neighbor. The second step is a propagation of the best locations from spatially neighboring patches, assuming high coherency for the spatial distribution of nearest neighbors.

"The Generalized PatchMatch Correspondence Algorithm", Barnes, C. et al., ECCV 2010 [2] extends the PatchMatch core idea to consider, apart from location, also scale and rotation as new search dimensions for 2D image patches. Further, acceleration techniques are described, including a search strategy that is called "enrichment" and that generalizes coherent or locally similar matches from spatial neighborhoods to neighborhoods in nearest neighbor space. A large performance gain can be achieved by considering Forward Enrichment if the search is done in exactly the same image and scale as the input. This reduces its applicability to only denoising problems.

US2013/163884 discloses enrichment of patch mapping by considering an initial patch's nearest neighbors and their respective nearest neighbors. The enrichment can be of a "forward" type or of an "inverse" type.

Unless mentioned otherwise, the term nearest neighbors as used herein refers to nearest neighbors in the patch space: for a given patch, nearest neighbors in the patch space are patches that are most similar to the given patch, as opposed to spatially nearest neighbors which are spatially adjacent to the given patch but not necessarily similar. A nearest-neighbor field (NNF) can be understood as a function $f:A \to R^2$ that is defined over all possible patch coordinates (locations of patch centers) in an image A. Given a patch coordinate a in image A and its corresponding nearest neighbor b in image B, the NNF is $f(a)=b$. Enrichment is defined as the propagation of good matches from a patch to its k nearest neighbors (k-NN), or vice versa. It improves a given NNF by considering a "richer" set of potentially good candidate matches than propagation or random search alone. In other words, propagation can be viewed as moving good matches along a rectangular lattice whose nodes are patch centers (pixels), whereas enrichment moves good matches along a graph where every node is connected to its k-NN. Forward enrichment uses compositions of the function f with itself to produce candidates for improving the nearest neighbor field (i.e. $f^2$). If f is a NNF with k neighbors, the NNF $f^2$ is constructed by looking at all $k^2$ of the nearest neighbors nearest neighbors. Different from Forward enrichment, inverse enrichment walks the nearest-neighbor pointers backwards to produce candidates for improving the NNF. Inverse enrichment computes the inverse $f^{-1}$ of the function f. The inverse $f^{-1}(a)$ may have zero values if no patches point to a patch, or multiple values if multiple patches point to a patch. A problem that remains to be solved is how to enhance the performance of ANNF based searches.

SUMMARY OF THE INVENTION

The invention is based on the concept of quickly generating a simple ANNF and then effectively enhancing the ANNF. This enhancing is made iteratively, wherein the number of iterations can be minimized. The disclosed solution for generating an enhanced ANNF allows minimizing the number of iterations in enhancing the ANNF. Further, the enhanced ANNF allows minimizing the number of search iterations for locating, for each patch of a source image or video, the k most similar patches out of all the available patches in a target image or video, since the better the ANNF, the less iterations are required in searching. The present invention provides a mechanism for introducing spatio-temporal Forward Enrichment across different scales and/or images, which improves known example search algorithms for various applications, e.g. super-resolution. This is of special interest for large scale example-based single-image or single-video super-resolution problems, where the downscaled structures for example search are always smaller than the input, but also for other image processing problems.

While defining an Approximate Nearest Neighbor Field (ANNF) for an input video requires many search operations due to the large amount of patches, it has been recognized that it is easier and quicker to generate an inverse ANNF (IANNF) for the input video, i.e. a NNF that defines for each patch of a downscaled version of an image one or more patches in the input video. According to the invention, the IANNF is then used to initialize the actual ANNF for the input video, wherein neighbors of patches that are similar to a current patch are considered. Both measures lead to a higher probability of finding good matches in less iterations. This holds particularly if a simple or (semi-) random search algorithm and propagation from spatial neighbor patches are used. Thus, for generating an ANNF, many positions in the ANNF can be filled by reversing the IANNF. As a result, there only remains the task of filling gaps in the ANNF, i.e. for patches that are not target patches of the IANNF. This is done by searching nearest neighbors (in the patch space) for patches that are not in the IANNF, i.e. patches that are not similar enough to any of the patches of any of the downscaled images in order to appear in their ANNFs. Also this step can be done in a (semi-) random search and can consider neighbors of similar patches. An advantage is that both the IANNF generation and the ANNF generation can (but need not necessarily) be achieved e.g. by a simple search or (semi-) random search, which is quicker to perform than a more precise search. The meaningful initialization of the ANNF through the IANNF and the propagation of good matches result in an improved ANNF. Another advantage is that the search steps in both the IANNF and ANNF generation can be executed simultaneously for several or all patches, which allows an efficient implementation on parallelized processors such as e.g. a GPU. The ANNF can be used for various image processing tasks, for example to obtain an upscaled version of the input video (for single-image super-resolution), denoising, deblurring, inpainting, image retargeting, optical flow estimation etc.

In principle, in one aspect the invention provides a method for generating an ANNF for images of an input video, the method comprising steps of generating a plurality of downscaled versions of the images of the input video at different spatial, temporal or spatio-temporal scales (i.e., a multi-scale pyramid), generating an IANNF for the input video by finding for each patch of the downscaled images one or more (up to k) similar patches in the input video, initializing an ANNF for the input video by reversing the IANNF, and completing (i.e. filling gaps in) the ANNF by searching nearest neighbors (up to k) for those patches of the input video that are not in the IANNF. This searching can be done in a (semi-) random way, as described below, or use any conventional method.

In one embodiment, further steps comprise determining for each current patch of the input video, among the patches defined in the ANNF for the respective patch or for one or more of its spatially neighboring patches, one or more (up to k) patches in the downscaled video. In one embodiment, further steps comprise sorting the determined (up to k) patches according to their similarity with the current patch, and selecting a subset of (up to k) most similar patches for the current patch among the sorted determined patches. In one embodiment, further steps are determining for each of these (up to k) most similar patches in the downscaled video one or more (up to $k_e/2$) patches in the input video according to the IANNF, resulting in (up to) $k*k_e/2$ patches in the input video, and for each of them determining their (up to k) nearest neighbors in the downscaled video using the ANNF, which results in (up to) $k^2k_e/2$ patches in the downscaled video. Finally, the $k^2k_e/2$ patches in the downscaled video are sorted according to their similarity with the current patch and the ANNF is, for the current patch, updated by the k most similar of these patches. Repeating this for all patches results in an enhanced ANNF for the input video.

In another aspect, the invention provides a method for upscaling an input video. The method comprises steps of generating an enhanced ANNF for the input video as described above, determining for each patch of the input video, among the patches defined in the ANNF for the respective patch (or additionally in any of its spatially neighboring patches, in one embodiment), one or more most similar patches in the downscaled images, determining larger patches in the input video that correspond to the one or more most similar patches in the downscaled images in terms of their position, and superimposing the determined larger patches of the input video to obtain an upscaled patch of an upscaled video. The complete upscaled video is obtained by repeating these steps for all patches of the input video. However, the ANNF can also be used in other video upscaling approaches, e.g. for super-resolution based on high-frequency transfer. In the latter case, it is not necessary to look for the corresponding patch in the original resolution. Instead, the low-resolution patch can be directly used.

In one embodiment, the invention provides a method for denoising (or deblurring) an input video, the method comprising steps of generating an enhanced ANNF for the input video as described above, determining for a current patch of the input video, among the patches defined in the ANNF for the current patch, one or more most similar patches in downscaled images, determining a degree of noise (or a degree of blur respectively) in the current patch and in the similar patches found by said searching, and if a found similar patch has less noise (or blur), replacing the current patch of the input video by the found similar patch with less noise (or blur).

In one embodiment, the invention provides an apparatus for generating an Approximate Nearest Neighbor Field (ANNF) for images of an input video, wherein the apparatus comprises a downscaler module for generating a plurality of downscaled versions of the images of the input video at different spatial, temporal or spatio-temporal scales, an IANNF generator module for generating an Inverse Approximate Nearest Neighbor Field (IANNF) for the input video by finding for each patch of the downscaled images one or more (up to k) similar patches in the input video, the patches of the downscaled images and the patches of the input video having a same size being a first size, an ANNF generator module for generating an Approximate Nearest Neighbor Field (ANNF) for the input video by reversing the IANNF and filling gaps in the ANNF by searching nearest neighbors for those patches of the input video that are not in the IANNF, and one or more memories for storing the plurality of downscaled versions of the images of the input video, the Inverse Approximate Nearest Neighbor Field (IANNF) and the Approximate Nearest Neighbor Field (ANNF).

In one embodiment, the apparatus further comprises an ANNF enhancement module for determining for each current patch of the input video, among the patches defined in the ANNF for the respective patch or for one or more of its spatially neighboring patches, one or more (up to k) patches in the downscaled video. In one embodiment, the ANNF enhancement module further is for sorting the determined (up to k) patches according to their similarity with the current patch, and selecting a subset of (up to k) most similar patches for the current patch among the sorted determined patches. Further, the ANNF enhancement module determines for each of these (up to k) most similar patches in the downscaled video one or more (up to $k_e/2$) patches in the input video according to the IANNF, resulting in (up to) $k*k_e/2$ patches in the input video, and for each of them determines their (up to k) nearest neighbors in the downscaled video using the ANNF, which results in (up to) $k^2k_e/2$ patches in the downscaled video. Finally, the ANNF enhancement module sorts $k^2k_e/2$ patches in the downscaled video according to their similarity with the current patch and updates the ANNF, for the current patch, by the k most similar of these patches. This is repeated for all patches of the input video. In one embodiment, the invention provides an apparatus for upscaling an input video, comprising the modules of the apparatus for generating an ANNF, as described above, a patch position determining module for determining larger patches in the input video that correspond to the one or more most similar patches in the downscaled images in terms of their position, and a superimposing module for superimposing the determined larger patches of the input video to obtain an upscaled patch of an upscaled video. Further, the one or more memories are also for storing at least parts of at least one image of said upscaled video, for at least the duration of the upscaling of the at least one image. In one embodiment, generating an IANNF comprises searching and storing for each patch of each downscaled version of the input video k best matching patches of same size in the input video, wherein $k_{e'}$ patches are selected (with $k<k_{e'}$) and among the $k_{e'}$ selected patches the k best matching patches are determined. In one embodiment, the $k_{e'}$ patches are selected randomly. In one embodiment, $k=\frac{1}{2} k_{e'}$. In one embodiment, determining the k best matching patches comprises ordering the $k_{e'}$ (randomly) selected patches according to their similarity with the respective input patch and selecting the k most similar patches. In various embodiments, similarity between patches is measured by a sum-of-differences, sum-of-absolute-differences or a sum-of-squares-of-differences between the patches. In various embodiments, patches have 3×3 pixels, 4×4 pixels or 5×5 pixels (although patches need not necessarily be square).

In one embodiment, when searching (or rather selecting) for a current patch of the input video one or more most similar patches in downscaled images among the patches defined in the ANNF, the searching/selecting is done among patches that the ANNF defines for the respective current patch and six of its spatio-temporally neighboring patches, namely the left-hand neighboring patch, right-hand neighboring patch, upper neighboring patch, lower neighboring patch, and collocated patch in temporally adjacent (previous and successive) images of the video. In one embodiment, the spatio-temporally neighboring patches are not overlapping with the current patch. In one embodiment, partially overlapping neighboring patches can be used in some or all cases instead of non-overlapping neighboring patches, for example where a non-overlapping neighboring patch is disturbed or partially outside the image.

In one embodiment, the invention relates to a computer readable medium having stored thereon executable instructions to cause a computer to perform a method for generating an ANNF comprising steps as disclosed above. In one embodiment, the computer readable medium has stored thereon executable instructions to cause a computer to perform a method for upscaling, denoising or deblurring an input video, comprising steps as disclosed above.

An advantage of the invention is that it reduces the required number of searches for achieving a certain desired level of accuracy. By using Forward Enrichment, an ANNF can be computed in as few as one iteration for each layer in the downscaled references and one iteration for the input video. Another advantage of the invention is that searching within a search window, which is very expensive in terms of processing power, can generally be omitted.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a flow-chart of a method for generating an ANNF using forward-enriched ANNF computation.

DETAILED DESCRIPTION OF THE INVENTION

The invention relates to simple and fast computation of Approximate Nearest-Neighbor Fields (ANNF) for images and video sequences. ANNF can be used, inter alia, in spatiotemporal super-resolution (SR), denoising, deblurring, inpainting (replacing portions of images by other image content) etc.

Figure 1:
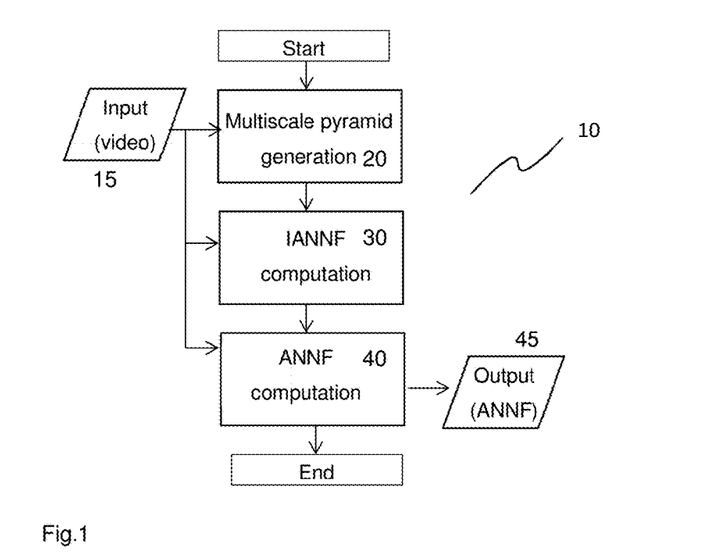

FIG. 1 shows, in one embodiment of the invention, a flow-chart of a method 10 for generating an ANNF for an input video 15 by using forward-enriched ANNF computation. The input video 15 is represented as a 3D tensor (or volume) obtained by stacking its frames. First, a multiscale pyramid is generated 20 by downsampling or downscaling the input video with different downsampling/downscaling factors. The multiscale pyramid step 20 results in a plurality of videos at different spatio-temporal resolutions. Since the multiscale pyramid may be already available, this step 20 is optional and not used in some embodiments. In the next step 30, the IANNF is generated. Generally, the IANNF defines, for each patch of a downsampled version of the video, one or more similar patches (in particular, its nearest neighbors found) in a less downsampled version of the video. In the present invention, the IANNF defines, for each patch of a downsampled version of the video, one or more similar patches (in particular, its nearest neighbors found) in the input video. The IANNF generating step 30 results in a IANNF, which is a data structure that is specific for the input video 15. In this embodiment, the same patch sizes are used (e.g. 3×3 pixel) in all downsampled versions of the input video and in the input video itself. Since the downsampled version of the video has less patches than the input video, the IANNF generating step 30 is much faster than generating a conventional ANNF. Finally, the ANNF is generated 40, wherein the IANNF is used for Forward Enrichment. That is, similarity relationships between patches that are defined in the IANNF are used in generating the ANNF. The IANNF and/or the ANNF can be temporarily or permanently stored in a memory, and can be represented as a data base, a file, a table etc. Both the IANNF and the ANNF can be implemented in the same manner or in different manners.

Figure 2:
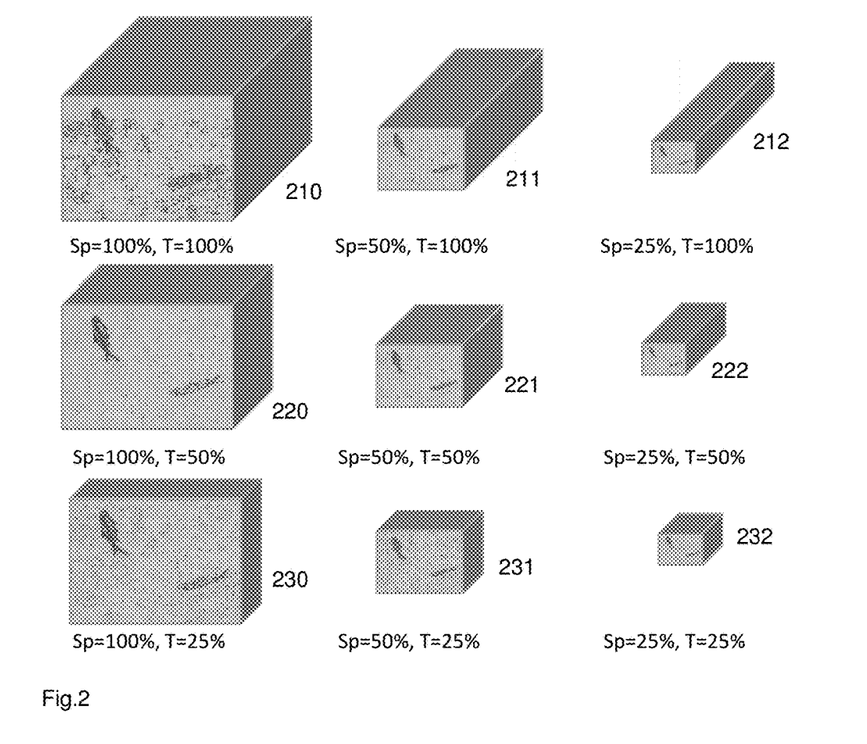
FIG. 2 a multi-scale pyramid for a video sequence.

FIG. 2 shows an exemplary multi-scale pyramid for a video sequence. An input video sequence 210 has a spatial resolution of 100% and a temporal resolution of 100%. Two successively spatially downscaled versions 211,212 of the input video have a spatial resolution of 50% and 25% respectively, while maintaining the temporal resolution at 100%. Further, two successively temporally downscaled versions 220,230 of the input video have a temporal resolution of 50% and 25% respectively, while maintaining the spatial resolution at 100%. Further downscaled versions 221,222,231,232 of the video have both spatial and temporal resolutions reduced to either 50% or 25%. It is noted that other downscaling factors can be used. Thus, the pyramid is composed by three temporal scales (vertical axis) and three spatial scales (horizontal axis), resulting in 3×3 layers. Each of these layers can be computed e.g. by appropriate filtering and decimation of the input video sequence, or recursively by filtering and decimating any of the "spatial", "temporal" or "spatiotemporal" parent layers. All layers are strictly smaller than the original one 210. In one embodiment for the example-based super-resolution problem, only the layers with both spatial and temporal scales smaller than 100% are required when searching for matches. The parent layers will only be used to extract high-resolution examples. This means that only the bottom right layers out of the total nine are to be used for search. We can note these layers have sizes ranging from ⅛ of the original (50% spatial, 50% temporal) down to 1/64 of the original (25% spatial, 25% temporal).

From this example we can observe a reverse search can be, in general, computed much faster than the direct search.

Figure 3:
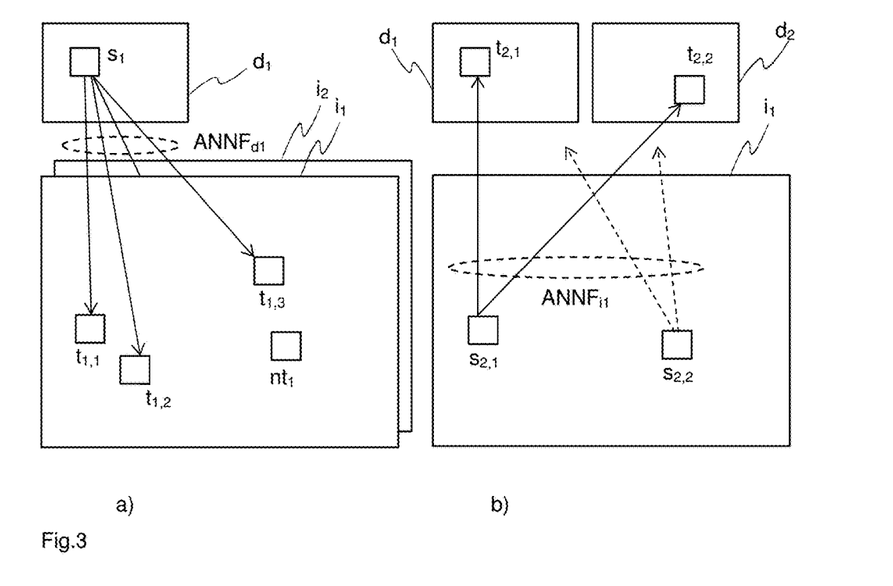
FIG. 3 Approximate Nearest Neighbor Fields (ANNF) of the input video and of the downscaled video.

FIG. 3 a) shows an Approximate Nearest Neighbor Field (ANNF) of the downscaled video, and FIG. 3 b) shows an Approximate Nearest Neighbor Field (ANNF) of the input video. In FIG. 3 a), the ANNF of an image $d_1$ of the downscaled video, referenced as $ANNF_{d1}$, defines for all patches $s_1$ of the image $d_1$ of the downscaled video one or more similar patches $t_{1,1}$, $t_{1,2}$, $t_{1,3}$ of the input video. These similar patches may but need not be in one or more images $i_1$, $i_2$ of the input video that are temporally adjacent to each other. In FIG. 3 a), the patches $s_1$ of the image $d_1$ of the downscaled video are source patches of the $ANNF_{d1}$, and the one or more similar patches $t_{1,1}$, $t_{1,2}$, $t_{1,3}$ of the input video are target patches of the $ANNF_{d1}$. It is important to understand that there may be patches $nt_1$ in the input video that are not target patches of the $ANNF_{d1}$, and that a target patch $t_{1,1}$, $t_{1,2}$, $t_{1,3}$ of the $ANNF_{d1}$ can be a multiple target patch of more than one source patch of the $ANNF_{d1}$.

Opposed to that, in FIG. 3 b) the Approximate Nearest Neighbor Field $ANNF_{i1}$ of an image $i_1$ of the input video defines for patches $s_{2,1}$, $s_{2,2}$ of the image $i_1$ of the input video one or more similar patches $t_{2,1}$, $t_{2,2}$ in one or more images $d_1$, $d_2$ of the downscaled video. These similar patches may but need not be in one or more images $d_1$, $d_2$ of the downscaled video that are temporally adjacent to each other. In FIG. 3 b), the patches $s_{2,1}$, $s_{2,2}$ of the image $i_1$ of the input video are source patches of the $ANNF_{i1}$, and the one or more similar patches $t_{2,1}$, $t_{2,2}$ of the downscaled video $d_1$, $d_2$ are target patches of the $ANNF_{i1}$. Also in this case, there may be patches in the downscaled video that are not target patches of the $ANNF_{i1}$, and target patches of the $ANNF_{i1}$, that are multiple target patches of more than one source patch.

When reversing an ANNF by swapping the relationship that an ANNF defines between patches, an Inverse ANNF (IANNF) is generated. For example, reversing the $ANNF_{i1}$ in FIG. 3 b) results in an IANNF that has the source patches $s_{2,1}$, $s_{2,2}$ of $ANNF_{i1}$ as target patches and the target patches $t_{2,1}$, $t_{2,2}$ of $ANNF_{i1}$ as source patches. In FIG. 3 b), this could be shown by swapping the arrow directions. Likewise, an IANNF can be reversed by swapping its source and target patches, thus obtaining an ANNF again. As has become clear, all source patches of an ANNF are in a same image while its target patches may belong to different images, and all target patches of an IANNF belong to a same image while its source patches may belong to different images. Note that although not explicitly shown in FIG. 3, each target patch of an ANNF can be a multiple target patch of more than one source patch. Thus, each source patch of an IANNF can be a source patch of more than one target patch.

Figure 4:
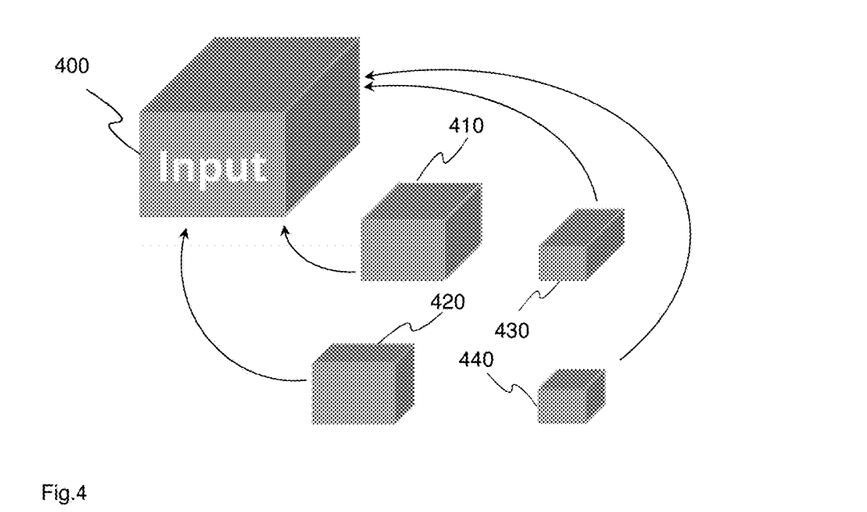
FIG. 4 a schematic of the Approximate Nearest Neighbor Fields (ANNFs) of the downscaled videos for generating the Inverse Approximate Nearest Neighbor Field (IANNF) of the input video.

FIG. 4 shows exemplarily a schematic of the ANNFs of the downscaled videos 410, . . . , 440 for generating the IANNF of the input video 400. Four downscaled versions 410, . . . , 440 of the input video are used that are both temporally and spatially downscaled. Each ANNF of a downscaled video 410, . . . , 440 defines, for each patch of its respective video, locations of a plurality of approximate nearest neighbors in the input video. In one embodiment that is described in the following, the list of approximate nearest neighbors is ordered according to similarity in the ANNF, such that the first patch in the list is the most similar. In one embodiment, the ANNFs of the downscaled videos 410, . . . , 440 are obtained by a random search within the input video 400. That is, patches of the input video are randomly picked, compared with the source patch from the downscaled video, and sorted according to their degree of similarity. This results in a sorted list of $k_e$ target patches for each source patch, where the first target patch is the one that is most similar to the source patch. For generating the ANNF of the input video 400, the ANNFs of the downscaled videos are reversed, as follows: from the list of $k_e$ target patches for each source patch of the ANNF of the downscaled videos, the first k (with k<$k_e$) are selected, and its respective source patch is used as a target patch to initialize the ANNF of the input video. An example is shown in Tab.1.

TABLE 1

| Source patch | Target patch | Similarity in % |
|---|---|---|
| a): ANNF of the downscaled video, IANNF of the input video | | |
| $p_{8, 10}$ | $p_{3, 82}$ x | 82 |
|  | $p_{15, 3}$ | 55 |
|  | $p_{54, 28}$ | 13 |
|  | $p_{36, 44}$ | 2 |
| $p_{4, 15}$ | $p_{71, 6}$ | 62 |
|  | $p_{3, 82}$ x | 44 |
|  | $p_{0, 27}$ | 1 |
|  | $p_{43, 96}$ | 1 |
| b): IANNF of the downscaled video, initial ANNF of the input video | | |
| $p_{3, 82}$ | $p_{8, 10}$ y | 82 |
|  | $p_{9, 15}$ | 74 |
|  | $p_{4, 15}$ y | 44 |
|  | — | — |

Tab.1 a) shows exemplarily a portion of an ANNF of a downscaled video, with $k_e$=4 and k=2. For example, a target patch $p_{3,82}$ (marked by x) has been randomly selected for a source patch $p_{8,10}$ and is the most similar of all the $k_e$ randomly selected target patches $p_{3,82}$, $p_{15,3}$, $p_{54,28}$, $p_{36,44}$. The same target patch $p_{3,82}$ has also been randomly selected for a different source patch $p_{4,15}$ and is among the k most similar of all the $k_e$ randomly selected target patches. When reversing the ANNF of the downscaled video in order to initialize the ANNF of the input video, the k top target patches of each source patch of each ANNF are considered, sorted according to their similarity and entered in the ANNF of the input video as an initialization. For example, in Tab.1 b) the ANNF target patches for the source patch $p_{3,82}$ are initialized with the patches $p_{8,10}$ and $p_{4,15}$ (marked by y), according to the relationship found in the ANNF random search for the downscaled video. The initialization of the ANNF of the input video is completed by searching remaining target patches for the source patches, e.g. the fourth target patch for the source patch $p_{3,82}$ in Tab. 1 b). To simplify the process, this patch can be randomly initialized, i.e. with a random patch. In another embodiment, a spatial neighbor of the already selected patches is used. In one embodiment, when all target patches are selected, they are ordered according to similarity.

The above-described combination of random selection of $k_e$ patches and selecting the k best matches among them ($k<k_e$) is referred to as semi-random search herein. The IANNF generating computes, for each downscaled video, the ANNF towards the input video. The set of all these ANNF is reversed to initialize the IANNF, which provides, for each patch in each downscaled video, the $k_e$ most similar patches in the input video. This information will later be used to propagate good matches to neighboring patches in the appearance space. A part of the ANNF of the input video can be simultaneously initialized with the positions of the up to k closest patches from the IANNF. This will only be possible for those patches that have been chosen as closest matches for any of the patches in the set of downscaled videos. For the rest of the patches, a default random initialization can be used in one embodiment.

Since this is an intermediate search, a single "Spatial propagation-Random search" iteration (core operation of PatchMatch) is sufficient. It is advantageous to choose a value of $k_e$ that is large enough so that at least the k (e.g. $k=k_e/2$) closest matches are relevant and therefore useful for the enrichment during the ANNF computation. In experiments, $k_e$ was set to twice the desired number of nearest neighbors k, e.g. $k_e$ in the range of 4-10. More details about the Spatial propagation-Random search iteration are described below. The quick reversed search from downscaled layers to the input video, also called IANNF generation herein, serves for learning similarities in appearance space. Finally, a forward search with forward enrichment (ANNF computation) exploits the learned similarities to propagate good results for neighbor patches in the appearance space, as described in the following.

The next step after ANNF generation and ANNF initialization is the ANNF refinement by forward enrichment. The goal of the ANNF refinement is to compute a refined ANNF of the input video towards the multiscale pyramid with a minimum number of iterations. As described above, the ANNF initialization is finished by filling the missing initial positions (up to k) for each patch in the input video with random positions (in scale, space and time). Then, the forward enrichment iteration is applied concurrently to each patch of the input video as follows:

First, the k matches from the neighboring spatio-temporal positions are propagated in order to try to improve the current set of matches. For this, the scale difference needs to be taken into account when applying the offset to the neighbor's position (e.g., if the best match of a neighbor is a scale of 50% that of the input, the single-scale spatial offset (1) is divided by 2 and rounded). Note that when computing the IANNF, the offset is multiplied by a factor larger than 1 before rounding.

Second, for each of the k nearest neighbors, the list of the $k_e/2$ nearest neighbors is obtained from the IANNF, each resulting in additional k nearest neighbors with similar appearance. The total number of enrichment propagation is therefore $k^2 k_e/2$. To speed up the process, the number of propagated examples can be limited based on the similarity between the source patch and each neighbor n in the list of k. For example, for n=1 (best match), we attempt to propagate $(k_e/2)k$; for n=2 $(k_e/2)(k/2)$; ... for n=k $(k_e/2)(k/2)$. In general, for the n-th closest match, $k_e k/(n+1)$ patches are propagated.

Third, for each of the k nearest neighbors, an iterative random search is performed with exponentially decaying scale and location margins, until the margin value one is reached for all dimensions.

In experiments, one single iteration of the proposed forward enriched search method performs equivalently to two or three iterations of the standard method (spatial propagation plus random search only), with a reduced computation time.

Figure 5:
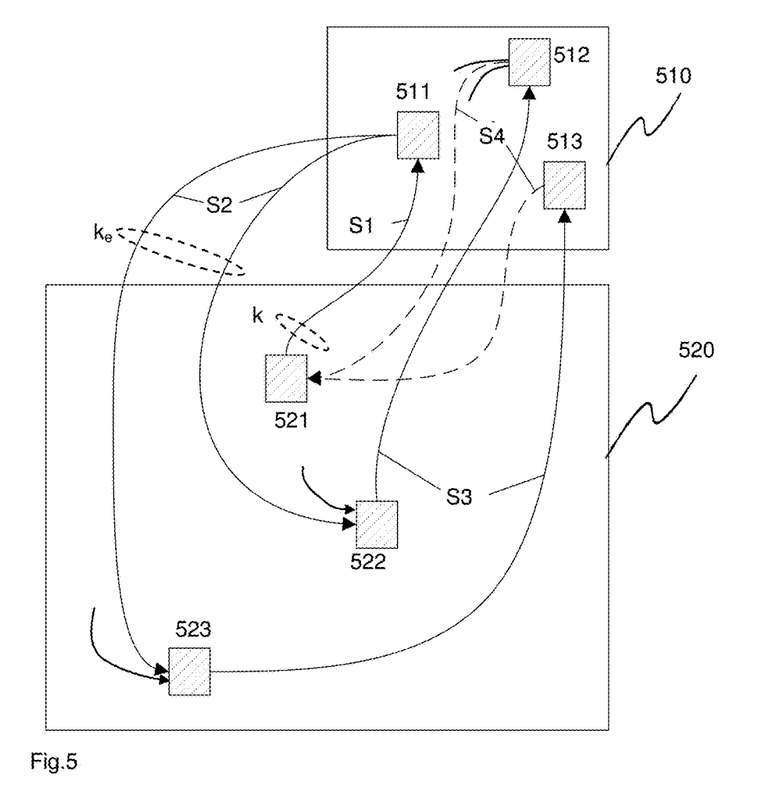
FIG. 5 the application of Forward Enrichment according to the invention.

FIG. 5 shows the usage of Forward Enrichment according to one embodiment of the invention. 51 denotes the current best match 511 in the downsampled video 510 for the current patch 521 of the input video 520. In one embodiment, it is the current best match among k randomly selected patches in the downsampled video 510. In another embodiment, it is the current best match according to the current ANNF (e.g. after ANNF initialization), i.e. a (semi-) random search in the input video 520 for patches of the downsampled video 510 resulted in the current patch 521 as one of the k best initial matches of the patch 511. S2 denotes the $k_e$ IANNF for the best match 511, according to the previously generated IANNF, where $k_e$ (or rather k) nearest neighbors of each patch of the downsampled video 510 were determined in the input video. In this example, two patches 522,523 are shown that were determined within the input video 520 for the downsampled patch 511. That is, two patches 522,523 exist in the input video 520 that have a relatively high probability to be neighbors in appearance space of the current patch 521. These patches 522,523 are usually not spatially adjacent to the current patch 521. Thus, once the k best matches 511 (among the $k_e$ randomly selected matches) for a current patch 521 are found, the IANNF is used to determine the nearest neighbors in appearance space of the current patch 521, which are 522,523 in this example. When the step S1 has been performed for all patches in the input video 520, each patch of the input video 520 has a current best match. In one embodiment, the step S1 is performed for some or all patches in at least a single image of the input video 520 simultaneously, e.g. using a GPU. Thus, when the step S1 has been performed for all patches in the input video 520, also the nearest neighbors 522,523 in appearance space of the current patch 521 have current best matches in the downsampled video 510. S3 denotes the current best matches 512,513 for the appearance-space neighbors 522, 523. Finally, these current best matches 512,513 for the appearance-space neighbors 522,523 are also compared with the current patch 521, since they may be better matches than its current best match 511. Among them, the best matching patch is selected, which typically improves the current best match for many patches by forward enrichment. The above-described single iteration may be repeated once or more often.

Figure 6:
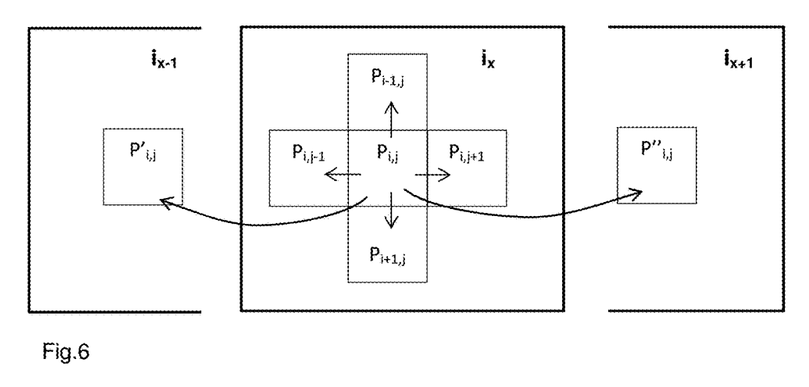
FIG. 6 spatio-temporally neighboring patches used for propagation.

In one embodiment, spatial neighbor propagation is used in the forward enrichment. Exemplarily, spatially neighboring patches used for propagation in the first step of the forward enrichment are shown in FIG. 6. E.g. for a source patch $P_{i,j}$ in the input image $i_x$, IANNF entries of four spatial neighbor patches $P_{i-1,j}$, $P_{i,j-1}$, $P_{i,j+1}$, $P_{i+1,j}$ and temporal neighboring patches $P'_{i,j}$, $P''_{i,j}$ (i.e. collocated patches from one or more temporally preceding images $i_{x-1}$ and/or one or more temporally successive images $i_{x+1}$) are considered. Their IANNF target patches are also compared with the current source patch $P_{i,j}$, and if a better match is found (i.e. a patch that is more similar to the current source patch $P_{i,j}$, than one of its current target patches), the newly found patch is added to the list of target patches in the IANNF for the current source patch $P_{i,j}$ (thus removing another target patch which is less similar).

Figure 7:
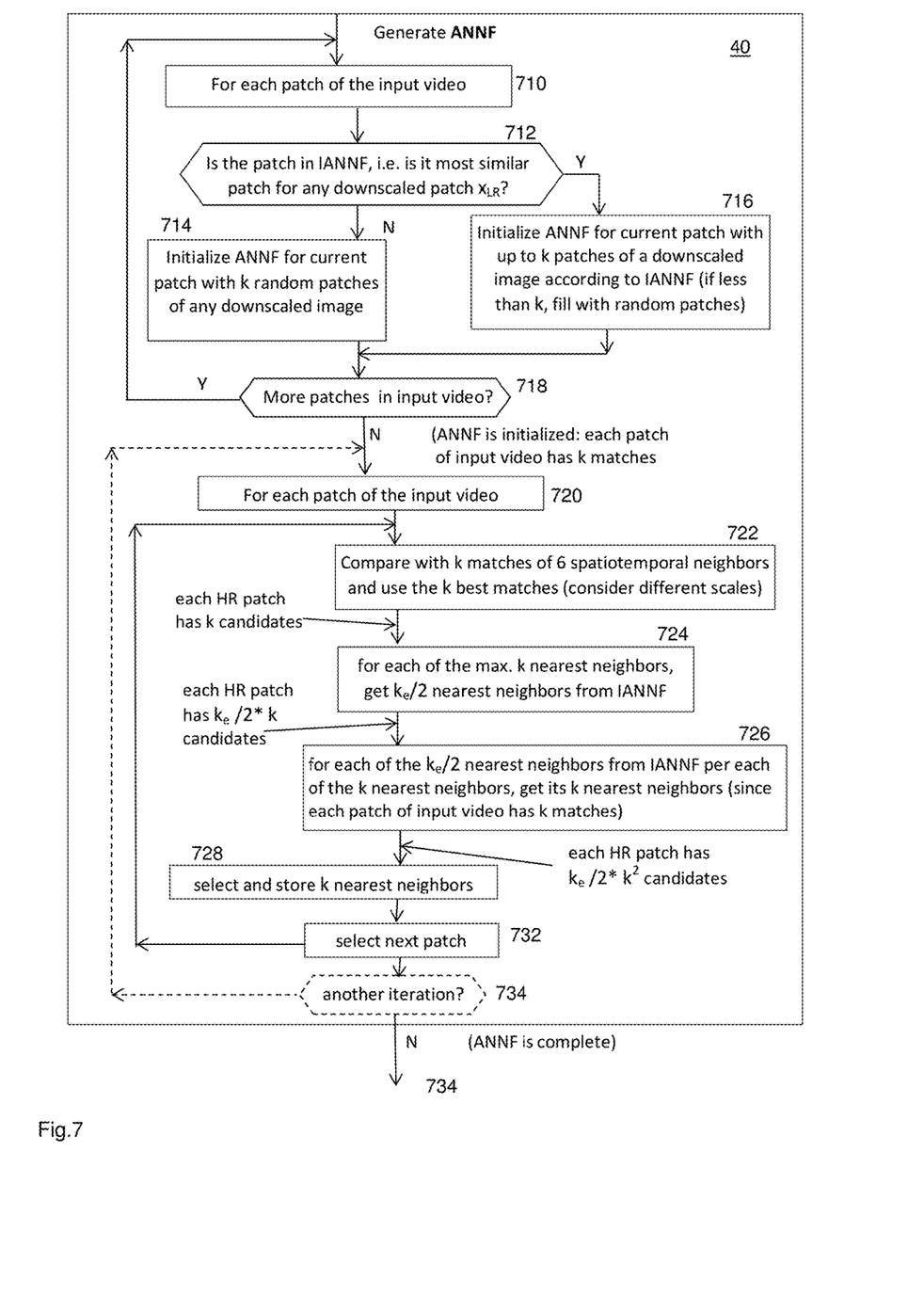
FIG. 7 a detailed flow-chart of a method for generating an ANNF using forward-enriched ANNF computation.

FIG. 7 shows an embodiment of a flow-chart of generating 40 the ANNF by reversing the IANNF. For each patch of the input video, it is determined 712 whether or not the current patch is in the ANNF of the downscaled video (or IANNF of the input video, respectively). If not, the ANNF of the input video is for the current patch initialized 714 with k (randomly) selected patches, which are then sorted according to their similarity with the current patch. Otherwise, the ANNF of the input video is for the current patch initialized 716 with up to k patches of a downscaled image, according to the IANNF of the input video, which are then sorted according to their similarity with the current patch. In one embodiment, if the IANNF has less than k entries for the patch, remaining positions are filled with random patches before the sorting. These steps 710-716 are repeated for all patches of the input video, which can be done simultaneously. At this point, the ANNF is initialized and each patch has k matches, which are sorted according to their relevance (i.e. similarity). As shown above, typically at least among the k best matches of either the current patch or one of its spatio-temporal neighbors there is a reasonably good candidate for a current patch. Therefore, the initialized ANNF is refined using spatial propagation 722: for each current patch of the input video, the k matches of its spatio-temporal neighbors are compared with the current patch. For this, the scale difference is taken into account when applying the offset to the neighbor's position (e.g., if the best match of a neighbor is a scale of 50% that of the input, the single-scale spatial offset (1) is divided by 2 and rounded). When computing the IANNF, the offset is multiplied by a factor larger than 1 before rounding. Now each HR patch has k candidate patches.

For each of the k candidates, $k_e/2$ nearest neighbors in appearance space are determined 724 using the IANNF, from which each results in additional k nearest neighbors with similar appearance 726 using the IANNF. Thus, as a result of the enrichment propagation, each HR patch has $k^2 * k_e/2$ candidates. In one embodiment, the number of propagated examples is limited. For example, for n=1 (best match), the propagation is $k_e/2$. For n=2, it is ($k_e/2 * k/2$), etc. In general, for the n-th closest match, $k_e * k/(n+1)$ patches are propagated in one embodiment.

Finally, in one embodiment, for each of the k nearest neighbors an iterative random search is performed with exponentially decaying scale and location margins, until margin "one" is reached for all dimensions.

In the following, further advantageous embodiments of the invention are described. In one embodiment, a method for generating an Approximate Nearest Neighbor Field (ANNF) for images of an input video comprises steps of generating a plurality of downscaled versions of the images of the input video at different spatial, temporal or spatio-temporal scales, generating an Inverse Approximate Nearest Neighbor Field (IANNF) for the input video by finding for each patch of the downscaled images one or more similar patches in the input video, wherein the patches of the downscaled images and the patches of the input video have a same size being a first size, generating an ANNF for the input video by reversing the IANNF, and filling gaps in the ANNF by searching nearest neighbors for those patches of the input video that are not in the IANNF.

In one embodiment, the step of generating an IANNF comprises selecting for each patch of each downscaled version of the input video a predefined number $k_{e'}$ of patches of the input video, and determining among the $k_{e'}$ selected patches the k best matching patches, with $k < k_{e'}$.

In one embodiment, the step of selecting for each patch of each downscaled version of the input video a predefined number $k_{e'}$ of patches of the input video comprises random selection of the $k_{e'}$ patches.

In one embodiment, the step of filling gaps in the ANNF by searching nearest neighbors for those patches of the input video that are not in the IANNF comprises performing a random search.

Figure 8:
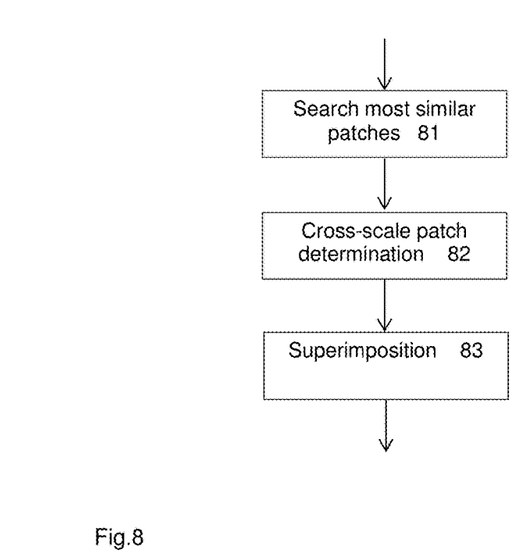
FIG. 8 a flow-chart of a method for upscaling an input video.

In one embodiment, as shown in FIG. 8, a method for upscaling an input video, wherein an Approximate Nearest Neighbor Field (ANNF) is generated, comprises further steps of searching (or rather selecting) 81 for each patch (e.g. 3×3 pixels) of the input video, among the patches defined in the ANNF for the respective patch, one or more most similar patches in downscaled images, wherein the patches of the downscaled images and the patches of the input video have said first size (e.g. 3×3 pixels), determining 82 enlarged patches (e.g. 5×5 pixels) in the input video that, in terms of position, correspond to the one or more most similar patches in the downscaled images, the enlarged patches having a second size (e.g. 5×5 pixels) being larger than the first size, and superimposing 83 the determined enlarged patches of the input video (e.g. 5×5 pixels) to obtain upscaled patches for the upscaled video, wherein the complete upscaled video is obtained by repeating the searching, determining and superimposing steps for each patch of the input video.

In one embodiment, the step of searching for each patch of the input video one or more most similar patches of downscaled images among the patches defined in the ANNF comprises selecting the patches that the ANNF defines for a current patch and the patches that the ANNF defines for any of a plurality of its respective spatially, temporally and/or spatio-temporally neighboring patches.

In one embodiment, the plurality of spatially, temporally and/or spatio-temporally neighboring patches of the current patch comprise the left-hand neighboring patch, the right-hand neighboring patch, the upper neighboring patch, the lower neighboring patch, and one collocated patch in each temporally adjacent image.

In one embodiment, the spatially neighboring patches of the current patch, including the left-hand neighboring patch, the right-hand neighboring patch, the upper neighboring patch and the lower neighboring patch of the current patch, are non-overlapping with the current patch.

In one embodiment, at least one of the spatially neighboring patches of the current patch is at least partially overlapping with the current patch, and at least one of the spatially neighboring patches of the current patch is not overlapping with the current patch.

In one embodiment, the method comprises dividing the input image or video and the downscaled images or videos into small overlapping patches.

In one embodiment of the invention, a method for generating an improved ANNF for an input video includes steps of creating a plurality of downscaled versions of the input video at different scales, dividing the input video and the downscaled videos into small overlapping patches, and searching, for each patch of the downscaled videos, positions of $k_{e'}$ best matching patches in the input video. The result is an Inverse Approximate Nearest Neighbor Field (IANNF) that provides, for each source patch position in the downscaled video, $k_{e'}$ target patch positions in the input video. Further steps of the method are storing the IANNF, initializing an Approximate Nearest Neighbor Field (ANNF), wherein the ANNF provides, for each source patch position of the input image, k (k being one or more) target patch positions in one or more of the downscaled images, and wherein if a current source patch position in the input image is a target patch position according to the IANNF, then its corresponding source patch position according to the IANNF is selected as target patch position for the current patch position in the ANNF. Then, the initialized ANNF is enhanced, patch by patch for all patches, as follows: a current patch of the input image is selected, a first enhancement step determines for the current patch of the input image (and a plurality of its spatio-temporal non-overlapping neighbor patches, in one embodiment) the target patch positions in the downscaled images using the ANNF, wherein among the patches at these target patch positions the positions of the $k_1$ best matches are selected, and wherein in a subsequent second enhancement step, for each of the $k_1$ best matches $k_{e'}$ target patch positions in the input video are determined using the IANNF. For each of the resulting $k_1 * k_{e'}$ patch positions, target patch positions in the downscaled video are determined using the ANNF, wherein $k * k_1 * k_{e'}$ patch positions are obtained, and among them the k best matches are selected. Finally, the ANNF is updated with the positions of these k best matches.

The resulting enhanced ANNF provides k target patch positions for each source patch position. In one embodiment, where the ANNF is recursively enhanced, the above-described steps of first enhancement of the ANNF and second enhancement of the ANNF are repeated in one or more repetitions. However, it is an advantage of the present invention that even without recursion a good ANNF is obtained.

In one embodiment of the invention, a method for upscaling an input video includes steps of generating an improved ANNF for an input video using an above-described method and upscaling the input video patch by patch, wherein each patch is upscaled using the improved ANNF.

Figure 9:
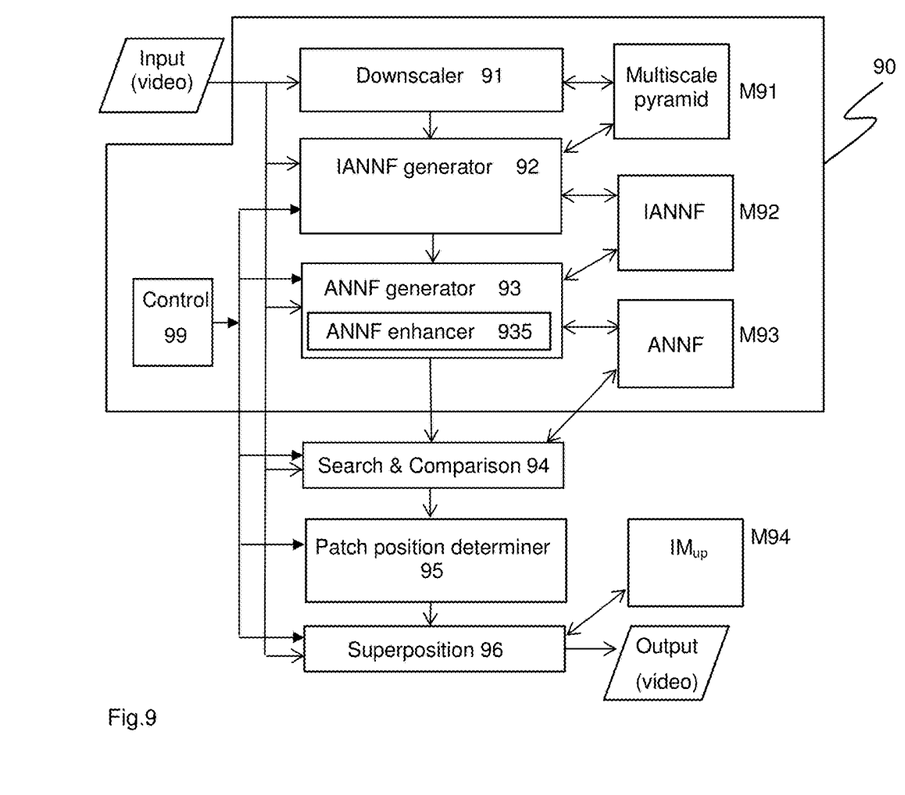
FIG. 9 the structure of an apparatus for generating an ANNF.

In one embodiment, as shown in FIG. 9, an apparatus 90 for generating an Approximate Nearest Neighbor Field (ANNF) for images of an input video comprises a downscaler module 91 for generating a plurality of downscaled versions of the images of the input video at different spatial, temporal or spatio-temporal scales, an IANNF generator module 92 for generating an Inverse Approximate Nearest Neighbor Field (IANNF) for the input video by finding for each patch of the downscaled images one or more similar patches in the input video, the patches of the downscaled images and the patches of the input video having a same size being a first size, an ANNF generator module 93 for generating an Approximate Nearest Neighbor Field (ANNF) for the input video by reversing the IANNF and filling gaps in the ANNF by searching nearest neighbors for those patches of the input video that are not in the IANNF, and one or more memories M91,M92,M93 for storing said plurality of downscaled versions of the images of the input video, said Inverse Approximate Nearest Neighbor Field (IANNF) and said Approximate Nearest Neighbor Field (ANNF). The one or more memories M91,M92,M93 may be physically outside the apparatus 90 but connected to the apparatus 90.

In one embodiment, the IANNF generator module comprises a patch selector module for selecting for each patch of each downscaled version of the input video a predefined number $k_{e'}$ of patches of the input video and a similarity determining module for determining among the $k_{e'}$ selected patches the k best matching patches, with $k < k_{e'}$. In one embodiment, the patch selector module performs random selection of the $k_{e'}$ patches.

In one embodiment, which is also shown in FIG. 9, an apparatus for upscaling an input video comprises an apparatus 90 for generating an Approximate Nearest Neighbor Field (ANNF) for images of an input video, and further comprises a search and comparison module 94 for searching (or rather selecting) for each patch of the input video, among the patches defined in the ANNF for a current patch (and a plurality of its respective neighboring patches, in one embodiment), one or more most similar patches in downscaled images, a patch position determiner module 95 for determining enlarged patches in the input video that correspond, in terms of spatial position, to the one or more most similar patches in the downscaled images, the enlarged patches having a second size being larger than the first size, and a superposition module 96 for initializing an upscaled video and superimposing the determined larger patches of the input video to obtain an upscaled patch of an upscaled video, wherein the one or more memories are also for storing at least parts of at least one image of said upscaled video.

In one embodiment, the apparatus further comprises an ANNF enhancement module 395 for determining for each patch of the input video, among the patches defined in the ANNF for the respective patch or for one or more of its spatially neighboring patches, one or more (up to k) patches in the downscaled video, sorting the determined (up to k) patches according to their similarity with the current patch, and selecting a subset of $k_e/2$ most similar patches for the current patch among the sorted determined patches. Further, the ANNF enhancement module 395 determines for each of these $k_e/2$ most similar patches in the downscaled video one or more (up to k) patches in the input video according to the IANNF, resulting in $k * k_e/2$ patches in the input video, and for each of them determines their (up to k) nearest neighbors in the downscaled video using the IANNF, which results in (up to) $k^2 k_e/2$ patches in the downscaled video. Finally, the ANNF enhancement module 395 sorts $k^2 k_e/2$ patches in the downscaled video according to their similarity with the current patch and updates the ANNF, for the current patch, by the k most similar of these patches. This is repeated for all patches of the input video. The ANNF enhancement module 395 may be included in the ANNF generator 93, as shown in FIG. 9, or a separate module that has access to the IANNF memory M92 and the ANNF memory M93.

In one embodiment, the apparatus further comprises a control module 91 for controlling one or more of the downscaler module, the IANNF generator module, the ANNF generator module, the search and comparison module, the patch position determining module and the superimposing module to repeat their respective operations as often as required for obtaining the complete upscaled video.

The above-mentioned modules may be implemented as hardware modules, or as software modules on one or more separate processors. Advantageously, at least one of the processors can be a graphics processor (GPU) for parallel execution of a plurality of tasks.

While the above description relates to images of an input video, the invention can also be applied to single input images that are not necessarily part of a video. The multi-scale pyramid uses then a plurality of downscaled versions of the input image at different spatial scales. Upscaling an input video herein generally means upscaling the images of the input video.

As has become clear, the present invention solves the problem of very quickly finding fairly good matches for patches of an input image or video sequence among a collection of multi-scale versions of the input image or video sequence. The proposed solution includes finding matches from all patches in all downscaled video layers to patches in only the input video sequence once, which is naturally faster than looking for matches throughout all possible layers and allows also better initialization of the ANNF, as compared to a random search. Then, the invention uses what can be described as 'f³ forward enrichment', since three hops are made: (1) from a current patch to its current best match(es) in any video layer (according to IANNF), (2) from that (those) best match(es) to the most similar one(s) in the input video sequence (according to the respective ANNF), and finally (3) from this (these) latter to its (their) current best match(es) in any video layer. The patches found in the third step have a high probability of comprising at least one good candidate for the current patch. This strategy results in a more efficient performance for multi-scale search than strategies known in the prior art that try to find all possible matches for patches in all available video layers, since in the present case only the matches for the input sequence are important.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to PatchMatch, one skilled in the art would recognize that the method and devices described herein is not limited to PatchMatch. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of both.

Connections may, where applicable, be implemented as wireless connections or wired, not necessarily direct or dedicated, connections.

The invention claimed is:

1. A method for generating an Approximate Nearest Neighbor Field for images of an input video, the method comprising:
generating by at least one processor an Inverse Approximate Nearest Neighbor Field for the input video from a plurality of downscaled versions of the images of the input video at different spatial, temporal or spatio-temporal scales, by finding for each patch of the downscaled images one or more similar patches in the input video, wherein the patches of the downscaled images and the patches of the input video have a same size being a first size;
generating by the at least one processor an Approximate Nearest Neighbor Field for the input video by reversing the Inverse Approximate Nearest Neighbor Field;
filling gaps by the at least one processor in the Approximate Nearest Neighbor Field by searching nearest neighbors for those patches of the input video that are not in the Inverse Approximate Nearest Neighbor Field; and
outputting image processing data based on said input video using the Approximate Nearest Neighbor Field.

2. The method according to claim 1, further comprising:
determining for each patch of the input video, among the patches defined in the Approximate Nearest Neighbor Field for the respective patch or for one or more of its spatially neighboring patches, one or more patches in the downscaled video;
sorting the determined patches according to their similarity with the current patch;
selecting a subset of up to k most similar patches for the current patch among the sorted determined patches, wherein k is a predefined number being one or more;
determining for each of the up to k patches in the downscaled video one or more, up to ke/2, patches in the input video according to the Inverse Approximate Nearest Neighbor Field, with k<ke;
for each of the determined up to k*ke/2 patches, determining its nearest neighbors in the downscaled video using the ANNF, which results in up to k2*ke/2 patches of the input downscaled video;
sorting the up to k2*ke/2 patches in the input downscaled video according to their similarity with the current patch; and
updating the Approximate Nearest Neighbor Field by the k most similar of these patches.

3. The method according to claim 1, wherein the generating an Inverse Approximate Nearest Neighbor Field comprises:
selecting for each patch of each downscaled version of the input video a predefined number ke' of patches of the input video; and
determining among the ke' selected patches the k best matching patches, with k being predefined and k<ke'.

4. The method according to claim 3, wherein the selecting for each patch of each downscaled version of the input video a predefined number ke' of patches of the input video comprises random selection of the ke' patches.

5. The method according to claim 3 or 4, wherein k=ke'/2.

6. The method according to claim 1, wherein the filling gaps in the Approximate Nearest Neighbor Field by searching nearest neighbors for those patches of the input video that are not in the Inverse Approximate Nearest Neighbor Field comprises performing a random search.

7. A method for upscaling an input video, wherein an Approximate Nearest Neighbor Field is generated according to claim 1, the method comprising:
determining for each patch of the input video, among the patches defined in the Approximate Nearest Neighbor Field for a respective patch or a spatially neighboring patch, one or more most similar patches in downscaled images, the patches of the downscaled images and the patches of the input video having said first size;
determining enlarged patches in the input video that, in terms of position, correspond to the one or more most similar patches in the downscaled images, the enlarged patches having a second size being larger than the first size; and
superimposing the determined enlarged patches of the input video to obtain upscaled patches for the upscaled video, wherein the complete upscaled video is obtained by repeating the determining the one or more most similar patches, determining the enlarged patches and superimposing for each patch of the input video.

8. The method according to claim 7, wherein the determining for each patch of the input video one or more most similar patches of downscaled images among the patches defined in the Approximate Nearest Neighbor Field comprises selecting among the patches that the Approximate Nearest Neighbor Field defines for a current patch.

9. The method according to claim 8, wherein the determining for each patch of the input video one or more most similar patches of downscaled images, among the patches defined in the Approximate Nearest Neighbor Field, further comprises selecting among the patches that the Approximate Nearest Neighbor Field defines for any of the current patches ' spatially, temporally and/or spatio-temporally neighboring patches, wherein the spatially neighboring patches of the current patch, including the left-hand neighboring patch, the right-hand neighboring patch, the upper neighboring patch and the lower neighboring patch of the current patch, are non-overlapping with the current patch.

10. The method according to claim 9, wherein at least one of the spatially neighboring patches of the current patch is at least partially overlapping with the current patch, and at least one of the spatially neighboring patches of the current patch is not overlapping with the current patch.

11. The method according to claim 1, further comprising generating by said at least one processor said plurality of downscaled versions of the images of the input video.

12. An apparatus for generating an Approximate Nearest Neighbor Field for images of an input video, the apparatus comprising:
   at least one processor configured for
   generating an Inverse Approximate Nearest Neighbor Field for the input video from a plurality of downscaled versions of the images of the input video at different spatial, temporal or spatio-temporal scales, by finding for each patch of the downscaled images one or more similar patches in the input video, the patches of the downscaled images and the patches of the input video having a same size being a first size; and for
   generating an Approximate Nearest Neighbor Field for the input video by reversing the Inverse Approximate Nearest Neighbor Field and filling gaps in the Approximate Nearest Neighbor Field by searching nearest neighbors for those patches of the input video that are not in the Inverse Approximate Nearest Neighbor Field; and
   one or more memories for storing said plurality of downscaled versions of the images of the input video, said Inverse Approximate Nearest Neighbor Field and said Approximate Nearest Neighbor Field;and
   at least one output for outputting image processing data based on said input video using said Approximate Nearest Neighbor Field.

13. The apparatus according to claim 12, wherein said at least one processor is further configured for:
   determining for each patch of the input video, among the patches defined in the Approximate Nearest Neighbor Field for the respective patch or for one or more of its spatially neighboring patches, one or more, up to k, patches in the downscaled video, wherein k is a predefined maximum;
   sorting the determined up to k patches according to their similarity with the current patch;
   selecting a subset of up to k most similar patches for the current patch among the sorted determined patches;
   determining for each of the subset of up to k most similar patches in the downscaled video one or more, up to ke/2, patches in the input video according to the IANNF, resulting in up to k*ke/2 patches in the input video;
   for each of them, determining their nearest neighbors in the downscaled video using the Approximate Nearest Neighbor Field, which results in up to k2ke/2 patches in the downscaled video;
   sorting up to k2ke/2 patches in the downscaled video according to their similarity with the current patch; and
   updating the Approximate Nearest Neighbor Field, for the current patch, by the k most similar of the sorted patches.

14. The apparatus according to claim 12, wherein the at least one processor is further configured, in generating said Inverse Approximate Nearest Neighbor Field, for:
   selecting for each patch of each downscaled version of the input video a predefined number ke' of patches of the input video; and
   determining among the ke' selected patches the k best matching patches, with k being predefined and k<ke'.

15. The apparatus according to claim 14, wherein the at least one processor is configured for performing random selection of the ke' patches.

16. The apparatus according to claim 12, wherein said at least one processor is further configured for generating said plurality of downscaled versions of the images of the input video.

17. The apparatus according to claim 12, wherein said at least one processor is further configured for:
   determining for each patch of the input video, among the patches defined in the Approximate Nearest Neighbor Field for a respective patch or a spatially neighboring patch, one or more most similar patches in downscaled images, the patches of the downscaled images and the patches of the input video having said first size;
   determining enlarged patches in the input video that, in terms of position, correspond to the one or more most similar patches in the downscaled images, the enlarged patches having a second size being larger than the first size; and
   superimposing the determined enlarged patches of the input video to obtain upscaled patches for the upscaled video, wherein the complete upscaled video is obtained by repeating said determining said one or more most similar patches, determining said enlarged patches and superimposing for each patch of the input video.

* * * * *